(12) United States Patent
Kawajiri

(10) Patent No.: US 10,442,215 B2
(45) Date of Patent: Oct. 15, 2019

(54) PRINTER AND CONTROL METHOD OF A PRINTER

(71) Applicant: SEIKO EPSON CORPORATION, Tokyo (JP)

(72) Inventor: Masahiro Kawajiri, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/923,718

(22) Filed: Mar. 16, 2018

(65) Prior Publication Data
US 2018/0281469 A1 Oct. 4, 2018

(30) Foreign Application Priority Data

Mar. 28, 2017 (JP) .................................. 2017-062538

(51) Int. Cl.
*B41J 11/00* (2006.01)
*B41J 3/407* (2006.01)
(Continued)

(52) U.S. Cl.
CPC ......... *B41J 11/0095* (2013.01); *B41J 3/4075* (2013.01); *B41J 11/70* (2013.01); *B41J 15/02* (2013.01); *B41J 15/046* (2013.01); *B65H 16/026* (2013.01); *B65H 16/06* (2013.01); *B65H 20/02* (2013.01); *B41J 2/15* (2013.01); *B65H 23/185* (2013.01); *B65H 2404/143* (2013.01); *B65H 2511/112* (2013.01); *B65H 2513/11* (2013.01); *B65H 2553/412* (2013.01); *B65H 2701/192* (2013.01); *B65H 2701/194* (2013.01); *B65H 2801/15* (2013.01);
(Continued)

(58) Field of Classification Search
CPC ...... B41J 11/70; B41J 11/0095; B41J 3/4075; B41J 15/02; B41J 15/046; B41J 2/15; B65H 16/026; B65H 16/06; B65H 20/02; B65H 23/185; B65H 2404/143; B65H 2511/112; B65H 2513/11; B65H 2553/412; B65H 2701/192; B65H 2701/194; B65H 2801/15; H04N 1/00037; H04N 1/00082; H04N 1/0066; H04N 1/00673
See application file for complete search history.

(56) References Cited

U.S. PATENT DOCUMENTS

2004/0155141 A1 8/2004 Tokunaga
2013/0222457 A1 8/2013 Nakada et al.

FOREIGN PATENT DOCUMENTS

| JP | 11-157716 A | 6/1999 |
| JP | 2004-142171 A | 5/2004 |
| JP | 2013-173281 A | 9/2013 |

*Primary Examiner* — Jannelle M Lebron
(74) *Attorney, Agent, or Firm* — Foley & Lardner LLP

(57) ABSTRACT

Technology enabling correctly detecting that paper has been delivered from a paper roll to the trailing end A printer has an inkjet head; a roll paper support; a delivery motor configured to rotate the roll paper supported by the roll paper support; a guide member configured to guide roll paper conveyed from the paper roll; and a detection switch disposed to a position where it detects the conveyed roll paper when the delivery point on the circumference of the paper roll moves to the part of the circumference of the roll on the same side of an imaginary line as the guide member; the delivery point being from which the conveyed roil paper separates from the roil when the paper roll turns; and the imaginary line being tangent to the guide member and passing through the center of the roll.

10 Claims, 5 Drawing Sheets

(51) Int. Cl.
*B41J 11/70* (2006.01)
*B41J 15/02* (2006.01)
*B41J 15/04* (2006.01)
*B65H 16/06* (2006.01)
*B65H 20/02* (2006.01)
*B65H 16/02* (2006.01)
*H04N 1/00* (2006.01)
*B41J 2/15* (2006.01)
*B65H 23/185* (2006.01)

(52) U.S. Cl.
CPC ....... *H04N 1/00037* (2013.01); *H04N 1/0066* (2013.01); *H04N 1/00082* (2013.01); *H04N 1/00673* (2013.01)

PRINTER AND CONTROL METHOD OF A PRINTER

CROSS-REFERENCE TO RELATED APPLICATION

The present application claims priority to Japanese Application No. 2017-062538, filed on Mar. 28, 2017, which is hereby incorporated by reference in its entirety.

BACKGROUND

The present disclosure relates to a printer.

Technology for detecting, in a printer that prints to paper delivered from a paper roll, that the paper has been delivered to the trailing end of the roll is known from the literature. JP-A-2013-173281, for example, describes a printer having a sensor that displaces according to the position of the paper delivered from a paper roll by a nip roller located on the downstream side of the paper path, and by displacement of the sensor detects when the trailing end of the paper has been delivered from the paper roll.

Some printers are also configured to produce slack in the paper between the paper roll and a conveyance roller disposed downstream therefrom on the paper path by causing the paper roll to rotate, and convey the paper. In printers so configured, it is possible for the paper that should be delivered from the paper roll is not delivered from the paper roll and rotates together with the paper roll, resulting in the position of paper that has already been delivered to change. When this happens in a printer configured as described in JP-A-2013-173281, delivery to the trailing end of paper from the paper roll may be erroneously detected even though the paper has not been delivered to the trailing end from the paper roll.

SUMMARY

The present disclosure is directed to this problem, and one objective of certain embodiments is to enable accurately detecting delivery of the trailing end of the paper from the paper roll.

According to on embodiment, a printer has: a print head; a roll paper support that supports roll paper; a driver configured to rotate the roll paper supported by the roll paper support; a path member configured to contact paper delivered from the roll paper; and a detector that detects the paper. The detector is disposed to a position where it detects the paper when a delivery position on the circumference of the roll of roll paper moves to a specific area on the circumference of the roll; the delivery position being the position where the paper separates from the roll when the roll paper turns, the specific area being the area of the circumference on the same side of a line as the path member, and the line being tangent to the path member and passing through the center of the roll.

When the paper does not separate from the circumference of the roll and the paper is dragged around the circumference of the roll as the roll turns in this configuration, the paper is pulled away from the roll when the delivery point where the paper separates from the roll moves on the circumference of the roll to the same side of a line as the path member, this line passing through the center of the roll and being tangent to the path member. Therefore, even if the paper is dragged around the circumference of the roll turns, the paper is not detected by the detector. And, if the paper is delivered from the roll to the trailing end of the paper, the point of separation of the paper from the roll moves to the area on the same side of the tangent as the path member, and the detector detects the paper. As a result, delivery of the paper from the roll to the trailing end of the paper can be correctly detected.

In another embodiment, the roll paper support has a flange configured to contact an end of the roll of roll paper.

This configuration enables correcting detecting delivery of the paper to the trailing end from the roll even when contact with the flange causes the paper to drag.

In another embodiment, the paper is label paper having labels affixed to a liner.

This configuration enables correcting detecting delivery of the paper to the trailing end from the roll even when adhesive from the label paper causes the paper to drag.

In another embodiment, the detector has a mechanical sensor.

This configuration can prevent erroneously detecting the taper was delivered to the trailing end from the roll due to chaff or paper dust from the paper, for example.

In another embodiment, the detector is disposed to the path member on a surface opposite to the roll paper support.

This configuration can more accurately detect delivery of the paper from the roil to the trailing end of the paper because the detector is disposed to the surface of the path member facing the roll paper support.

Other objects and attainments together with a fuller understanding of the invention will become apparent and appreciated by referring to the following description and claims taken in conjunction with the accompanying drawings.

DESCRIPTION OF EMBODIMENTS

Figure 1:
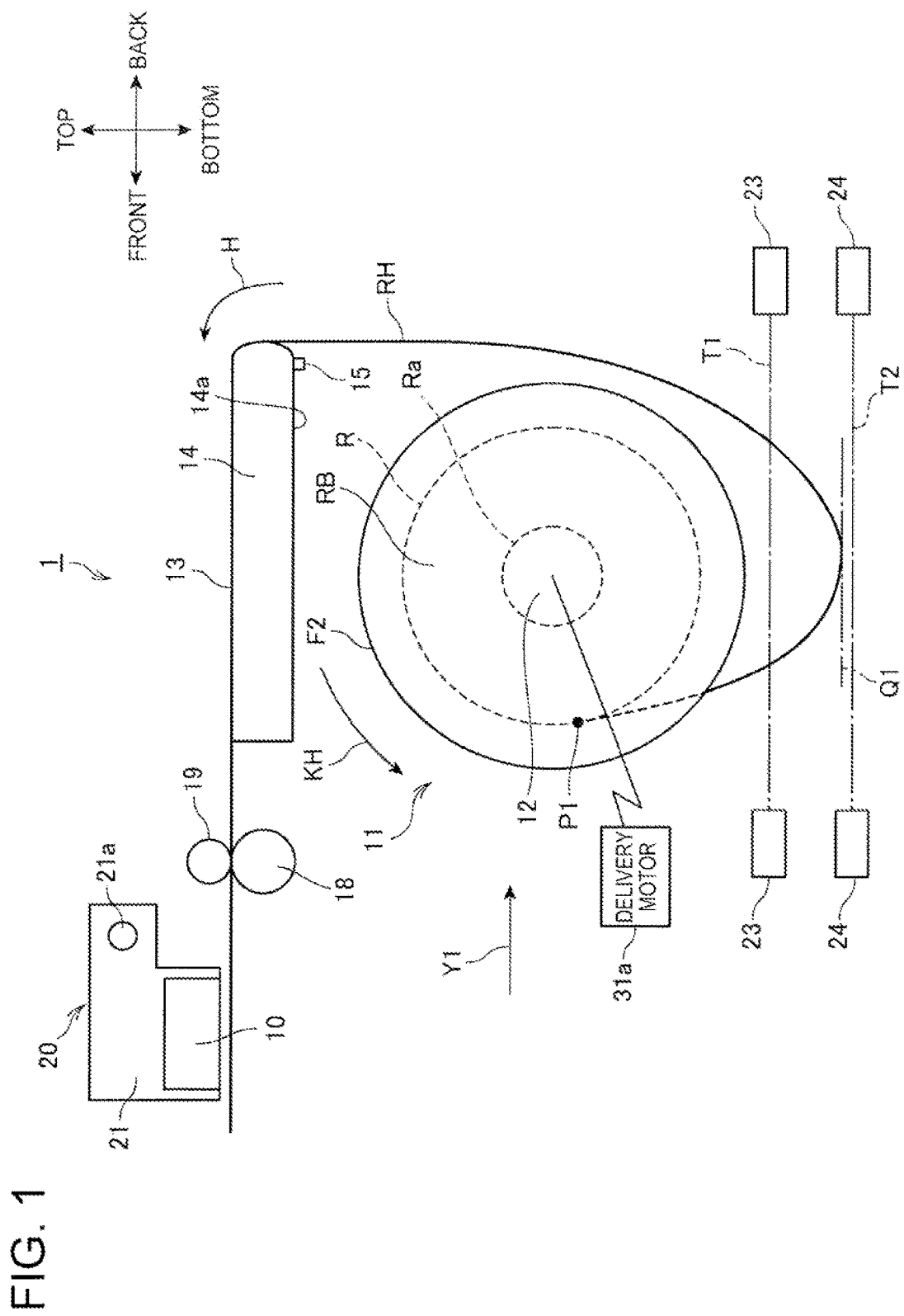
FIG. 1 schematically illustrates the configuration of main parts of the printer.

FIG. 1 schematically illustrates the configuration of main parts of a printer 1 according to an embodiment of the invention.

As indicated by the arrows in FIG. 1 and other figures, the direction to the left side of the figure is to the front of the printer 1 and the direction to the right side of the figure is to the back, the direction to the top side of the figure is to the top of the printer 1 and the direction to the bottom side of the figure is to the bottom.

The printer 1 in this example is a serial inkjet printer. The printer 1 stores roll paper R, which in this example is label paper wound in a roll and having labels affixed at a regular interval to a liner, and delivers the roll paper R from the paper roll in the conveyance direction H. The roll paper R is formed by winding label paper onto a core Ra with the trailing end of the paper attached to the core Ra. In this example, the trailing end of the label paper is attached to the core Ra so that, when a force working to tear the trailing end of the label paper from the core Ra is applied to the trailing end of the label paper, the trailing end of the label paper remains attached to the core Ra in resistance to the tearing force. For example, the trailing end of the label paper may be attached strongly to the core Ra by bonding the trailing end to the core Ra with adhesive.

The printer 1 prints by ejecting ink onto the conveyed roll paper R from an inkjet head 10 (printhead) configured as a serial printhead.

As shown in FIG. 1, the printer 1 has a roll paper compartment 11 in which the roll paper R is held. The portion of the roll paper R wound into a roll and stored in the roll paper compartment 11 is referred to below as the paper roll RB (roll), and the portion of the roll paper R that is unrolled and delivered from the paper roll RB in the roll paper compartment 11 is referred to as the unrolled paper RH (paper).

A spindle 12 roll paper support) is fit through the tubular core Ra disposed in the center of the paper roll RB inside the roll paper compartment 11. The spindle 12 supports the paper roll RB through the core Ra. The spindle 12 is connected through a power transfer mechanism (not shown in the figure) to the drive shaft of a delivery motor 31*a* (drive device) described below. As a result, the paper roll RB turns in conjunction with rotation of the spindle 12 in direction of rotation. KH, and the unrolled paper RH is delivered from the paper roll RB turning in the direction of rotation KH.

As shown in FIG. 1, a conveyance path 13 through which the unrolled paper RH is conveyed is formed in the printer 1. The printer 1 also has a guide member 14 (path member) on the conveyance path 13. The unrolled paper RH delivered from the paper roll RB is conveyed in contact with the guide member 14 through the conveyance path 13 in the conveyance direction H.

A detection switch 15 (detection device) is disposed to the guide member 14 on the roll paper compartment 11 side surface 14*a* facing the roll paper compartment 11. The detection switch 15 has a mechanical sensor. The detection switch 15 outputs a first detection value while this sensor is pushed (referred to below as depressed), and outputs a second detection value when the sensor is not depressed (referred to below as released). The specific location of the detection switch 15 is described below.

Downstream from the guide member 14 in the conveyance direction H is disposed a conveyance roller 18, and opposite the conveyance roller 18 is a driven roller 19. The unrolled paper RH is held between the conveyance roller 18 and driven roller 19, and is conveyed in the conveyance direction H as the conveyance roller 18 turns. The conveyance roller 18 is connected through a power transfer mechanism (not shown in the figure) to the drive shaft of the conveyance motor 32*a* described below (FIG. 3), and rotates as driven by the conveyance motor 32*a*.

A printing mechanism 20 is disposed downstream in the conveyance direction H from the conveyance roller 18. The printing mechanism 20 includes a carriage 21, and a inkjet head 10 mounted on the carriage 21. The carriage 21 is supported on a carriage rail 21*a* extending in the scanning direction perpendicular to the conveyance direction H, and moves the inkjet head 10 in the scanning direction along the carriage rail 21*a*. The inkjet head 10 in this example has nozzle rows for multiple colors of ink, such as the four colors cyan (C), yellow (Y), magenta (M), black (K). The inkjet head 10 prints by ejecting ink supplied from ink cartridges not shown from nozzles formed in nozzle rows, forming dots on the unrolled paper RH.

As shown in FIG. 1, vertically below the roll paper compartment 11 are disposed a first slack detection sensor 23 and a second slack detection sensor 24. The second slack detection sensor 24 is below the first slack detection sensor 23. The first slack detection sensor 23 is an optical sensor, and outputs different detection values to the controller 30 when the unrolled paper RH is at detection position T1 and when the unrolled paper RH is not at the detection position T1. The second slack detection sensor 24 is also an optical sensor, and outputs different detection values to the controller 30 when the unrolled paper RH is at detection position T2, the detection position T2 being lower than detection position T1, and when the unrolled paper RH is not at the detection position T2. The process of the controller 30 (FIG. 3) based on input from the first slack detection sensor 23 and second slack detection sensor 24 is described below.

Figure 2:
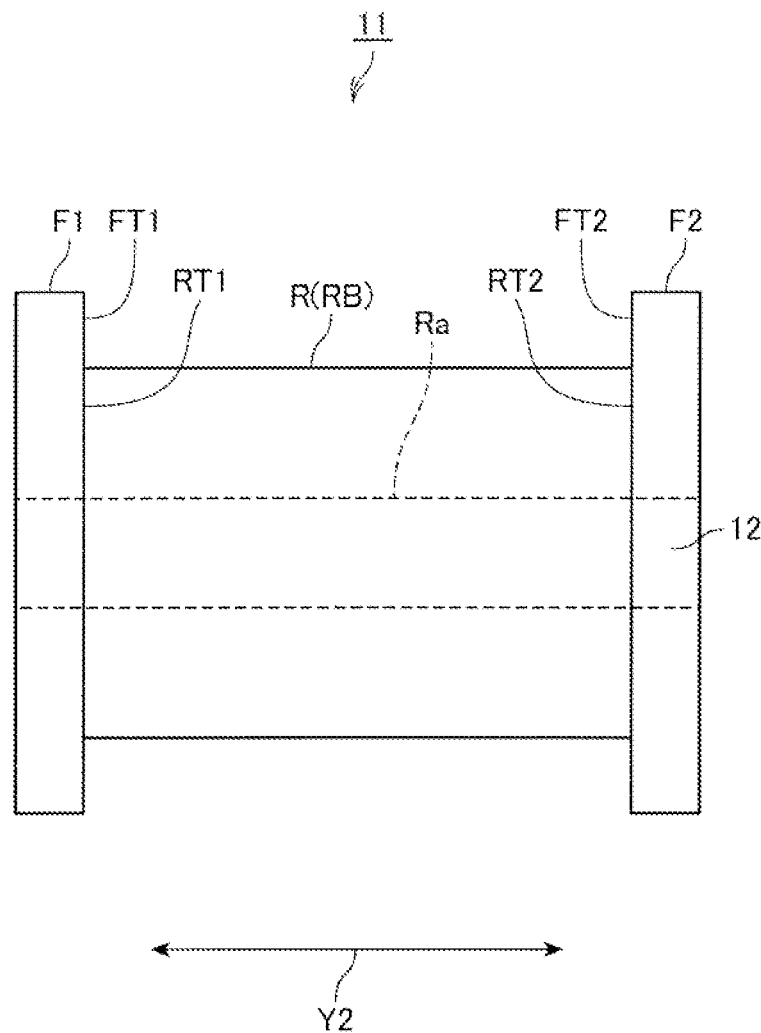
FIG. 2 illustrates the paper roll storage compartment.

FIG. 2 schematically illustrates the roll paper compartment 11 as seen from the direction of arrow Y1 in FIG. 1 (looking from the front to the back) in a format useful for description.

As shown in FIG. 2, the roll paper R stored in the roll paper compartment 11 is fit onto a spindle 12 passing through the core Ra and extending in the axial direction Y2, which is the same direction as the core Ra, and is supported by the spindle 12.

A disc-shaped flange F1 is fit onto the spindle 12. The flange F1 moves in the axial direction Y2 on the spindle 12, and is fixed to the spindle 12 in contact with one end RT1 of the roll paper R. The outside circumference of the surface FT1 of the flange F1 that touches the end RT1 is greater than the maximum circumference of the paper roll RB. The area of the surface FT1 is therefore greater than the maximum area of the end RT1 of the roll paper R.

Another disc-shaped flange F2 is also fit onto the spindle 12. The flange F2 also moves in the axial direction Y2 on the spindle 12, and is fixed to the spindle 12 in contact with the other end RT2 of the roll paper R. The outside circumference of the surface FT2 of the flange F2 that touches end RT2 is greater than the maximum circumference of the paper roll RB. The area of the surface FT2 is therefore greater than the maximum area of the end RT2 of the roll paper R.

Because the paper roll RB is thus held between flange F1 and flange F2 in the roll paper compartment 11, skewing of the paper roll RB in the roll paper compartment 11 is reduced, and skewing of the unrolled paper RH delivered from the paper roll RB when conveyed through the conveyance path 13 is also reduced.

Figure 3:
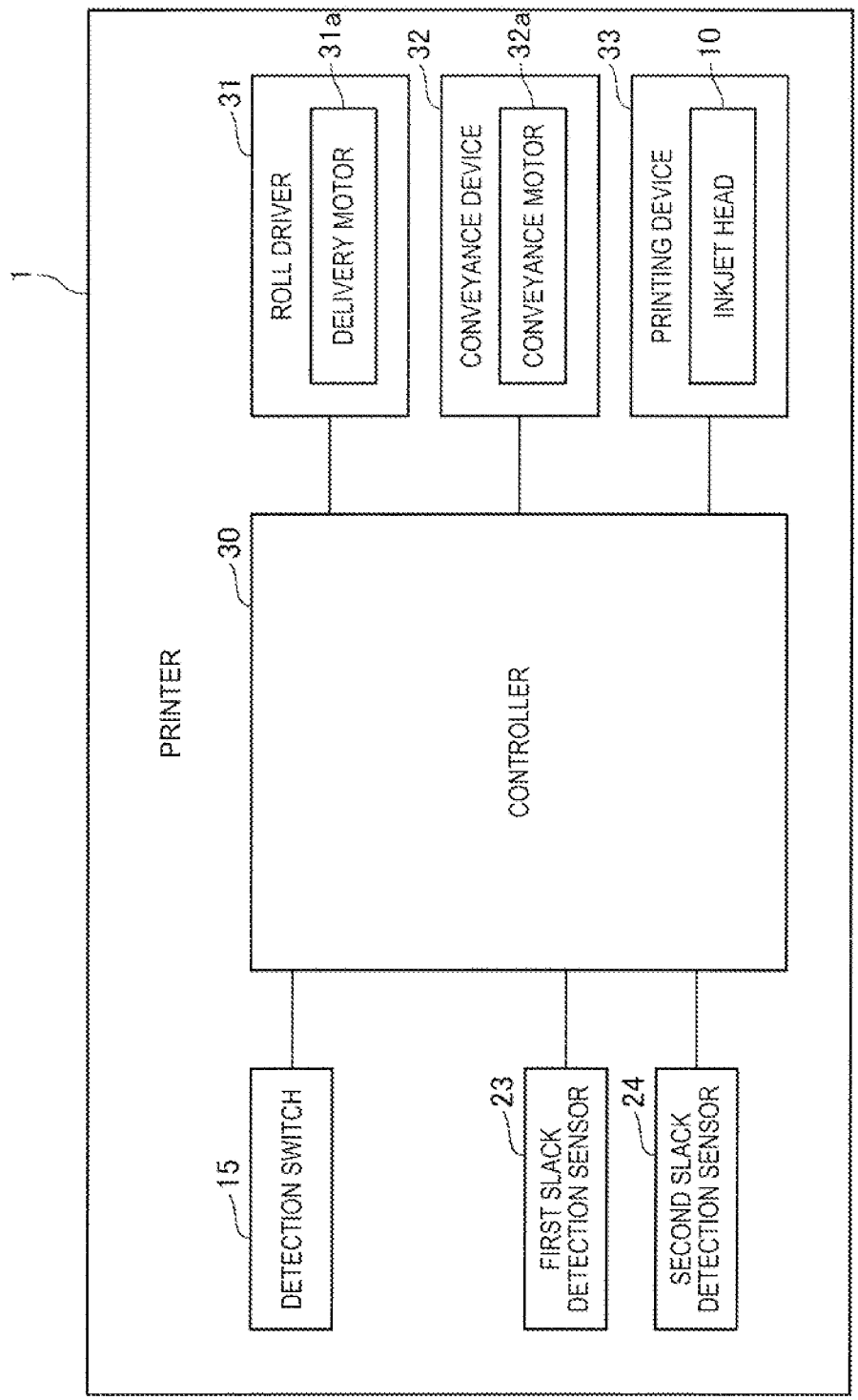
FIG. 3 is a block diagram illustrating the functional configuration of the printer.

FIG. 3 is a block diagram illustrating the functional configuration of the printer 1.

As shown in FIG. 3, the printer 1 has a controller 30, roll driver 31, conveyance device 32, and printing device 33.

The controller 30 includes a CPU, ROM, RAM, ASIC, and other signal processing circuits not shown, and controls other parts of the printer 1. The controller 30 executes processes by the cooperation of hardware and software, such as a CPU reading a program from ROM to RAM and running the program, or by executing processes through functions embodied in an ASIC, or by executing processes by a signal processing circuit processing signals. Detection values from the detection switch 15, first slack detection sensor 23 and second slack detection sensor 24 are input to the controller 30.

When the first detection value is input from the detection switch 15, the controller 30 determines the unrolled paper RH was delivered from the paper roll RB to the trailing end of the label paper. When the second detection value is input from the detection switch 15, the controller 30 determines the unrolled paper RH has not been delivered from the paper roll RB to the trailing end o the label paper.

The spindle 12 drive configuration of the roll driver 31 includes the delivery motor 31*a,* the power transfer mechanism that transfers drive power from the delivery motor 31*a* to the spindle 12, and a motor driver that drives the delivery motor 31a. The roll driver 31, as controlled by the controller 30, drives the delivery motor 31a, rotationally driving the spindle 12 and the core Ra supported by the spindle 12, and delivers unrolled paper RH from the paper roll RB.

The unrolled paper RH conveyance configuration of the conveyance device 32 includes the conveyance motor 32a, the power transfer mechanism that transfers drive power from the conveyance motor 32a to the conveyance roller 18, and a motor driver that drives the conveyance motor 32a. The conveyance device 32, as controlled by the controller 30, drives the conveyance motor 32a to turn the conveyance roller 18, and convey the unrolled paper RH delivered from the paper roll RB.

The printing device 33 includes the inkjet head 10 and carriage 21. The printing device 33, as controlled by the controller 30, forms dots by means of the inkjet head 10 and prints images on the unrolled paper RH conveyed by the conveyance device 32.

The printer 1 in this embodiment has a first state and a second state.

The first state is the state of the printer 1 as shown in FIG. 1, that is, there is sufficient label paper remaining on the paper roll RB, and the printer 1, as controlled by the controller 30, can position the unrolled paper RH below the detection position T1.

When the printer 1 is in the first state, the controller 30 controls the roll driver 31 to turn the spindle 12 simultaneously to the conveyance device 32 conveying the unrolled paper RH to deliver the unrolled paper RH from the delivery point P1 of the paper roll RB (the position where the paper separates from the roll, as shown in FIG. 1).

The delivery point P1 is the position on the circumference of the paper roll RB where the unrolled paper RH separates from the paper roll RB, and is delivered to the conveyance path 13 side, as the spindle 12 turns. The unrolled paper RH separates from the outside circumference of the paper roll RB at the delivery point P1, and is conveyed by the conveyance device 32 through the conveyance path 13.

When the printer 1 is in the first state, the controller 30, based on the detection value input from the first slack detection sensor 23 and the detection value input from the second slack detection sensor 24, manages the vertical relationship between the lowest position Q1 of the recording head (see FIG. 1), the detection position T1, and the detection position T2.

The lowest position Q1 is the lowest position to which the unrolled paper RH descends in the portion of the unrolled paper RH between the delivery point P1 and guide member 14. The controller 30 controls the roll driver 31 and adjusts rotation of the spindle 12 to adjust the length of unrolled paper RH delivered from the paper roll RB so that the lowest position Q1 is kept at a position vertically below the detection position T1 and vertically above the detection position T2 (that is, between the detection position T1 and the detection position T2). In other words, when the first slack detection sensor 23 detects that the unrolled paper RH is not at the detection position T1, the controller 30 controls the roll driver 31 to turn the spindle 12 in the direction of rotation KH.

By keeping the lowest position Q1 below the detection position. T1 and above the detection position T2, slack is produced in the unrolled paper RH between the delivery point P1 and guide member 14. As a result, tension (force) on the unrolled paper RH pulling the unrolled paper RH in the opposite direction as the conveyance direction H is reduced, and slipping between the conveyance roller 18 and driven roller 19 is suppressed.

Figure 4:
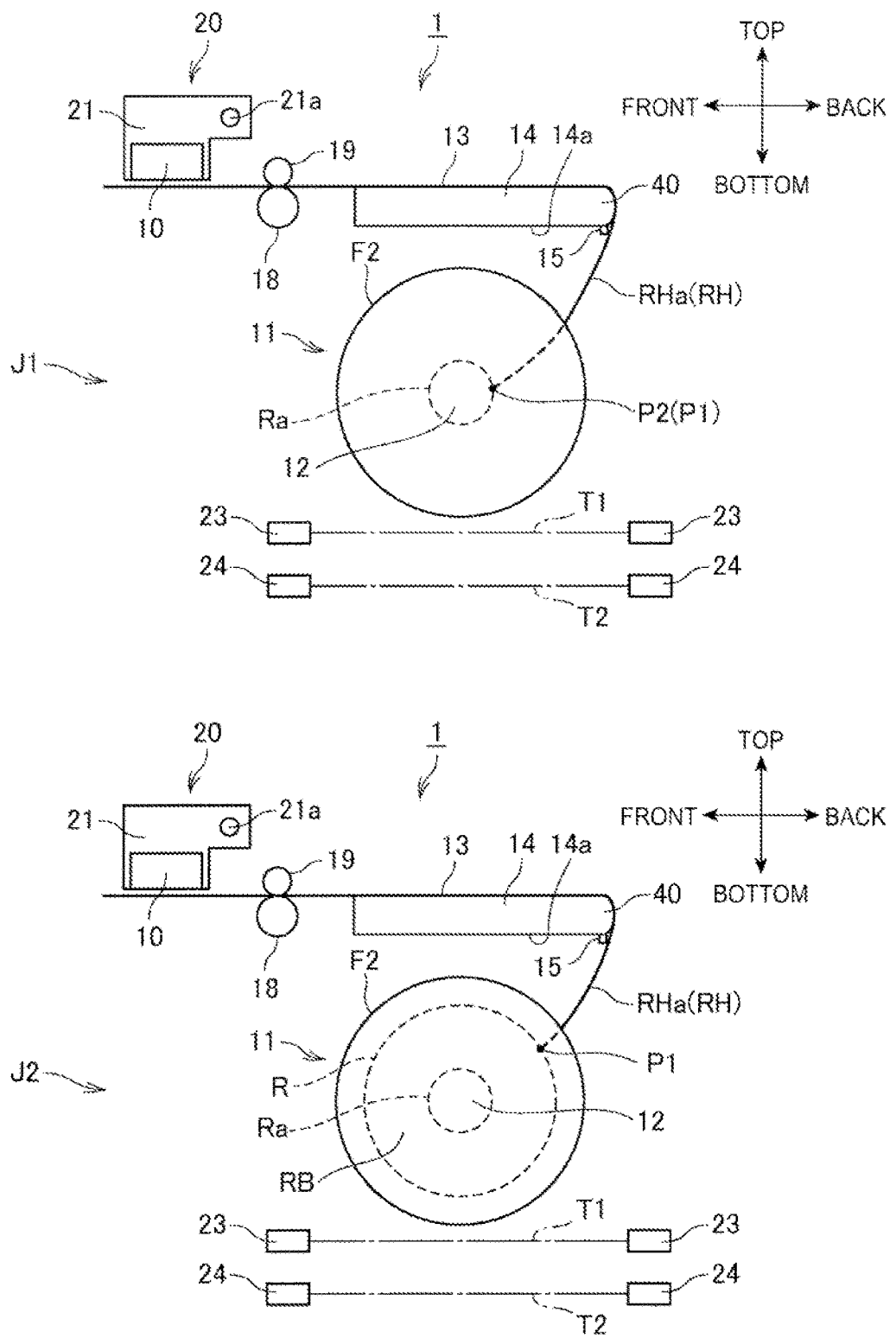
FIG. 4 illustrates a second state of the printer.

The second state has two states as shown in FIG. 4. In both states, the slack in the unrolled paper RH is determined, based on the first slack detection sensor 23 and second slack detection sensor 24, to be less than in the first state of the printer 1.

The second state of the printer 1 is described below with reference to FIG. 4.

Note that like parts are referenced by the same reference numerals in FIG. 4 and FIG. 1, and further description thereof is omitted. Note also that the front, back, top, and bottom in FIG. 4 are the same as in FIG. 1.

Below, the unrolled paper RH between the delivery point P1 and guide member 14 is referred to as the conveyed paper RHa.

State J1 in FIG. 4 occurs when there is not enough label paper on the paper roll RB to position the conveyed paper RHa below the detection position T1, and the controller 30 cannot position the conveyed paper RHa below the detection position T1. Note that the printer 1 is in the first state immediately after a roll paper R with sufficient label paper left is installed in the printer 1. As the roll paper R is consumed, the state of the printer 1 goes from the first state to state J1.

More specifically, in the state J1 in FIG. 4, the delivery point P1 and the attachment point P2 are the same. The attachment point P2 is where the trailing end of the label paper is attached to the core Ra. In other words, in state J1 in FIG. 4, the unrolled paper RH has been delivered from the paper roll RB to the trailing end of the label paper.

If conveyance of the conveyance roller 18 continues after the delivery point P1 and attachment point P2 match, the slack in the conveyed paper RHa between the delivery point P1 (that is, the attachment point P2) and the guide member 14 decreases as the conveyance roller 18 continues turning. In the state J1 in FIG. 4, the spindle 12 is turned in the direction of rotation KH based on the detection value input from the first slack detection sensor 23, and the delivery point P1 moves in the direction of rotation KH from the bottom toward the top along the circumference of the core Ra. Because the delivery point P1 moves as the slack in the conveyed paper RHa decreases and then disappears, the position of the conveyed paper RHa rotates around the end 40 of the guide member 14 to the guide member 14 side (vertically up).

As the conveyed paper RHa rotates upward, part of the conveyed paper RHa approaches the detection switch 15. Part of the conveyed paper RHa then contacts the sensor of the detection switch 15, the sensor is pushed by part of the conveyed paper RHa, and the sensor of the detection switch 15 moves from the released position to the depressed position. In other words, the detection switch 15 detects, by the rotational movement of the conveyed paper RHa, that part of the conveyed paper RHa is at a specific position.

State J2 in FIG. 4 represents a state in which dragging has occurred, and it can be determined, based on the detection value input from the first slack detection sensor 23, that the unrolled paper RH is not at the detection position T1. Dragging, in this example, indicates that paper RH that would normally have been unrolled and delivered from the paper roll RB has not separated from the paper roll RB, remains stuck to the circumference of the roll, and moves with rotation of the spindle 12 in the direction of rotation KH around the circumference of the paper roll RB. In other words, when dragging occurs, the delivery point P1 moves with rotation of the spindle 12 in the direction of rotation KH around the circumference of the paper roll RB.

Dragging can result from curling of the roll paper R or static electricity. Dragging can also result when the force holding the paper RB between flange F1 and flange F2 exceeds some threshold, and when the label paper moves in the direction separating from the paper roll RB, the friction produced between the end RT1 of the roll paper R and surface FT1, and the end RT2 and the surface FT2, is great. Dragging can also result when adhesive holding the labels to the liner collects between either or both the end RT1 of the roll paper R and surface FT1, and the end RT2 and the surface FT2, and the accumulated adhesive inhibits delivery of the unrolled paper RH from the paper roll RB.

When dragging occurs, slack in the conveyed paper RHa be ween the delivery point P1 and guide member 14 decreases as shown in state J2 in FIG. 4. In addition, in state J2 in FIG. 4, because the spindle 12 turns in the direction of rotation KH based on the detection value input from the first slack detection sensor 23, the delivery point P1 moves up in the direction of rotation KH from the bottom along the circumference of the paper roll RB. By the delivery point P1 moving when the slack in the conveyed paper RHa decreases and disappears, the position of the conveyed paper RHa rotates around the end 40 to the top of the guide member 14 side (that is, vertically up). As the conveyed paper RHa then continues rotating up, part of the conveyed paper RHa contacts the detection switch 15. Depending on the location of the detection switch 15, part of the conveyed paper RHa that contacts the sensor of the detection switch 15, the sensor is pushed by part of the conveyed paper RHa, and the sensor of the detection switch 15 moves from the released position to the depressed position.

In the second state created by dragging as described above, the unrolled paper RH has not been delivered from the paper roll RB the trailing end of the label paper. However, if the sensor of the detection switch 15 moves from the released position to the depressed position due to dragging, the detection switch 15 inputs the first detection value to the controller 30. As, a result, the controller 30 may determine that the unrolled paper RH has been delivered from the paper roll RB to the trailing end of the label paper, even though the unrolled paper RH has not been delivered from the paper roll RB to the trailing end of the label paper.

Figure 5:
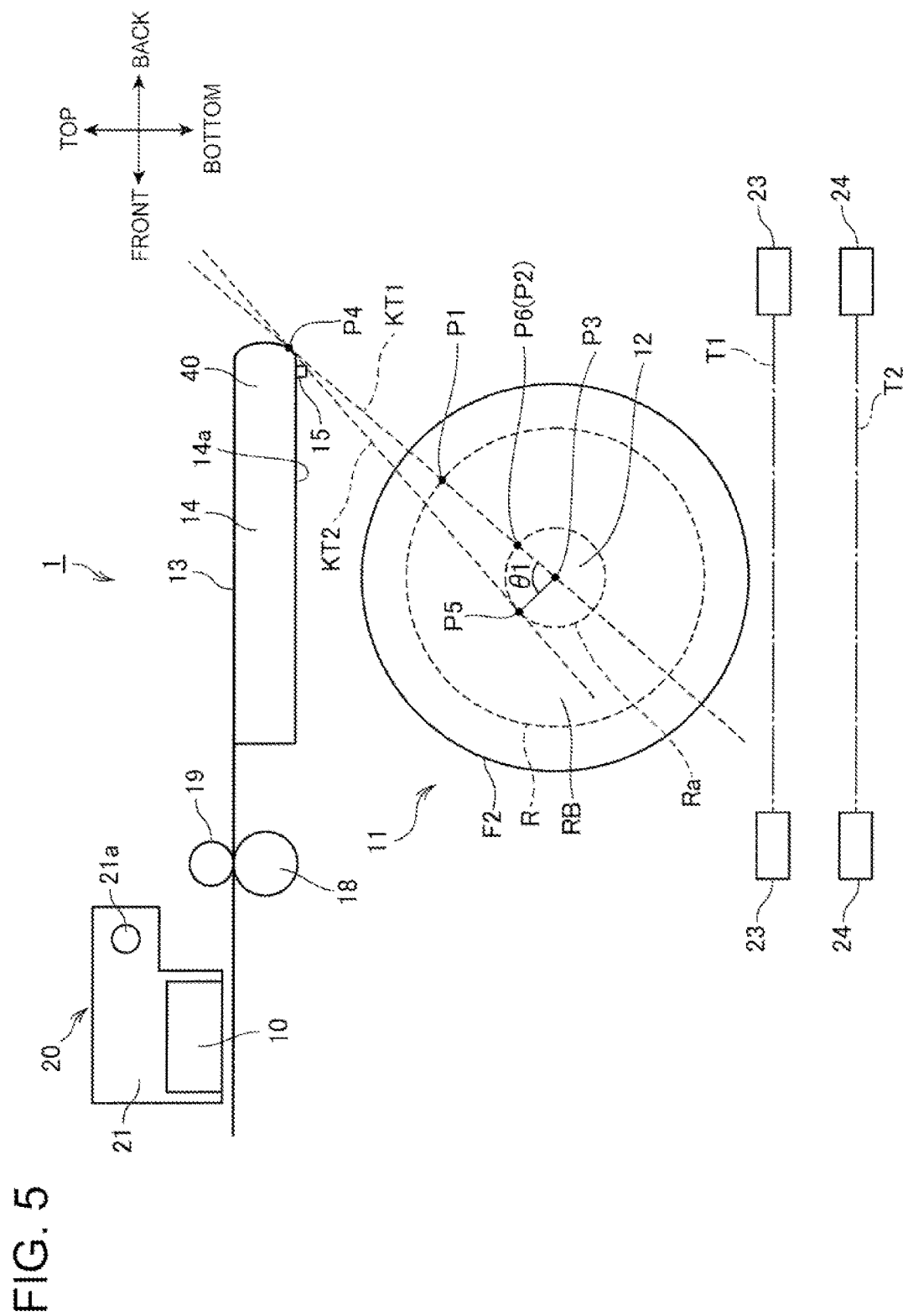
FIG. 5 describes the location of a detection switch.

As a result, the detection switch 15 this embodiment of the invention is located as shown in FIG. 5.

FIG. 5 describes where the detection switch 15 is positioned.

Note that like parts are referenced by the same reference numerals in FIG. 4 and FIG. 1, and further description thereof is omitted. Note also that the front, back, top, and bottom in FIG. 5 are the same as in FIG. 1.

Imaginary line KT1 is a line through point P4 on the guide member 14, and the center point P3 of the spindle 12. Point P4 is a specific position on the end 40 of the guide member 14. When there is sufficient label paper remaining, the unrolled paper RH and the guide member 14 are separated on the upstream side with respect to the point P4 in the conveyance direction H. And, when there is sufficient label paper remaining, the unrolled paper RH contacts the guide member 14 on the downstream side with respect to the point P4 in the conveyance direction H. In other words, the point P4 is the position to where, when there is sufficient label paper remaining, the unrolled paper RH contacts the guide member 14 on the downstream side with respect to. More specifically, point P4 is on the upstream end in the conveyance direction H of the area of the guide member 14, where the unrolled paper RH contacts the guide member 14.

The imaginary line KT1 is also an imaginary line indicating the position of the conveyed paper RHa when, due to conveyance by the conveyance roller 18 and rotation of the spindle 12, slack in the conveyed paper RHa disappears between the delivery point P1 and guide member 14, and force working to tear the conveyed paper RHa from the paper roll RB at the delivery point P1 starts to work.

The imaginary line KT1 is also a tangent to the guide member 14 passing through the center point P3 of the paper roll RB.

The detection switch 15 is positioned so that, when the delivery point P1 moves from the back to the front in the direction of rotation KH, and the delivery point P1 moves to the front side of the imaginary line KT1, part of the conveyed paper RHa contacts the sensor and the sensor is pushed to the depressed position. In other words, when the delivery point P1 moves along the circumference of the paper roll RB to the area on the same side of the imaginary line KT1 as the guide member 14, the state of the sensor of the detection switch 15 changes to the depressed state. That is, the detection switch 15 is positioned where it detects part of the conveyed paper RHa when the delivery point P1 moves in the direction away from the end 40 of the guide member 14.

Because the detection switch 15 is positioned as described above, the detection switch 15 inputs to the controller 30 two different detection values referenced to the imaginary line KT1.

More specifically, when the delivery point P1 moves in the direction of rotation KH from the back to the front, and the delivery point P1 moves to the front side of the imaginary line KT1, the detection switch 15 detects that part of the conveyed paper RHa is at a specific position, and inputs the first detection value to the controller 30.

When the delivery point P1, or the attachment point P2, moves in the direction of rotation KH from the back to the front, and the delivery point P1 is located between the back and the imaginary line KT1, the detection switch 15 does not detect part of the conveyed paper RHa, and inputs the second detection value to the controller 30.

After the conveyed paper RHa is positioned at the position indicated by the imaginary line KT1, if the delivery point P1 moves from the imaginary line KT1 to the front due to rotation of the spindle 12, the delivery point P1 while a state of no slack is maintained in the conveyed paper RHa. As a result, force moving the unrolled paper RH in the direction tearing away from the paper roll RB works on the paper roll RB. When the delivery point P1 moves in the direction away from point P4 due to rotation of the spindle 12 in the direction of rotation KH with no slack in the conveyed paper RHa, the chance that the unrolled paper RH will be pulled away from the paper roll RB is therefore great. In other wards, the possibility that the unrolled paper RH will be separated from the paper roll RB, and the problem of the unrolled paper RH being dragged along with the paper roll RB will be resolved, by movement of the delivery point P1 as described above is great.

The detection switch 15 is therefore located as described above at a position where part of the conveyed paper RHa being in a specific position can be detected when the delivery point P1 moves in the direction away from the end 40 of the guide member 14. As a result, the possibility that the sensor goes to the depressed state drops. Therefore, when dragging occurs, the chance of the first detection value being input from the detection switch 15 to the controller 30 drops.

The chance of the controller 30 of the printer 1 determining that the unrolled paper RH has been delivered to the trailing end of the label paper even though the unrolled paper RH has not been delivered to the trailing end of the label paper therefore also drops.

However, when the unrolled paper RH has been delivered to the trailing end of the label paper, the delivery point P1 (that is, the attachment point P2) moves to the front side of the imaginary line KT1 in conjunction with rotation of the spindle 12 while a state of no slack in the conveyed paper RHa is maintained. Because the detection switch 15 is positioned where it detects part of the conveyed paper RHa at a specific position when the delivery point P1 moves in the direction away from the end 40 of the guide member 14, the conveyed paper RHa moves vertically upward so as to turn around the end 40 as the delivery point P1 (that is, the attachment point P2) moves to the front side of the imaginary line KT1.

As a result, the detection switch 15 inputs the first detection value to the controller 30, and the controller 30 can therefore determine that the unrolled paper RH was delivered to the trailing end of the label paper. By disposing the detection switch 15 to the position described above, detection errors resulting from dragging can be reduced, and delivery of the unrolled paper RH from the paper roll RB to the trailing end of the label paper can be correctly determined.

As described above, dragging can result from the flange F1 in contact with the end RT1 of the roll paper R. More specifically, dragging may occur when the force of the flange F1 and flange F2 holding the roll paper R exceeds the holding force that reduces skewing of the paper roll RB and enables delivering unrolled paper RH smoothly from the paper roll RB. In other words, when the flange F1 is pushed against the end RT1 with great force, dragging can easily result from the friction load of the surface FT1 of the flange F1 against the unrolled paper RH. Therefore, by positioning the detection switch 15 as described above, the likelihood of the sensor of the detection switch 15 being depressed due to dragging is reduced even if dragging results from flange F1 and flange F2. Therefore, even if dragging occurs in a printer 1 having a flange F1, detection errors resulting from such dragging are reduced, and delivery of the unrolled paper RH to the trailing end of the label paper can be correctly determined.

Dragging can also result when adhesive holding the labels to the liner collects between either or both the end RT1 of the roll paper R and surface FT1 of the flange, and the end RT2 and the surface FT2 of the flange. Therefore, by positioning the detection switch 15 as described above, the likelihood of the sensor of the detection switch 15 being depressed due to dragging is reduced even if dragging is caused by adhesive from the label paper. Therefore, even if dragging occurs when delivering label paper in the printer 1, detection errors resulting from such dragging are reduced, and delivery of the unrolled paper RH to the trailing end of the roll paper R can be correctly determined.

As shown in FIG. 5, the detection switch 15 is disposed to the surface 14a of the guide member 14 facing the spindle 12. As described above, when the conveyed paper RHa is positioned on the imaginary line KT1, and the delivery point P1 or attachment point P2 then moves in the direction of rotation KH, the conveyed paper RHa moves up and rotates centered on the end 40. That is, the conveyed paper RHa moves toward the surface 14a in conjunction with the delivery point P1 or attachment point P2 moving in n the direction of rotation KH. Because the detection switch 15 is disposed to the surface 14a, the sensor of the detection switch 15 reliably contacts part of the conveyed paper RHa moving up and rotating around the end 40. As a result, the detection switch 15 reliably detects that the conveyed paper RHa is positioned above the imaginary line KT1. Therefore, by disposing the detection switch 15 to surface 14a, the printer 1 can more reliably determine that the unrolled paper RH has been delivered to the trailing end of the label paper.

As described above, the detection switch 15 has a mechanical sensor. The sensor contacts part of the conveyed paper RHa, and moves from the released state to the depressed state when pushed by part of the conveyed paper RHa. More specifically, because the detection switch 15 has a mechanical sensor, the chance of the state of the sensor being changed by chaff or paper dust from the roll paper R, for example, is reduced. The chance of erroneously determining, due to foreign matter such as chaff or paper dust from the roll paper R, that the unrolled paper RH has been delivered from the paper roll RB to the trailing end of the label paper even though the unrolled paper RH has not been delivered from the paper roll RB to the trailing end of the label paper is therefore prevented.

By locating the detection switch 15 as described above, the chance of the detection switch 15 outputting the first detection value to the controller 30 due to dragging is reduced, and the controller 30 can therefore accurately determine when the unrolled paper RH has been delivered from the paper roll RB to the trailing end of the label paper.

However, the unrolled paper RH may not be separated from the paper roll RB even after the delivery point P1 moves to the front side of the imaginary line KT1 and the sensor of the detection switch 15 may be pushed to the depressed state. The unrolled paper RH may not be separated even after the delivery is due, for example, to the quality or curling of the label paper, how the flange F1 and F2 are fixed on the spindle 13, or the force of adhesive. By executing the operation described below in this event, the controller 30 can more accurately detect when the unrolled paper RH has been delivered to the trailing end of the label paper.

The operation of the printer 1 when the state of the printer 1 is the second state is described below.

When the controller 30 of the printer 1 determines the detection value input from the detection switch 15 changed from the second detection value to the first detection value, the controller 30 determines the unrolled paper RH was delivered to the trailing end of the roll paper R, and controls the roll driver 31 to start turning the spindle 12 a specific amount in the direction of rotation KH.

The specific amount in this embodiment of the invention is an amount of rotation greater than or equal to angle of rotation $\theta 1$ shown in FIG. 5. This angle of rotation $\theta 1$ is the angle formed by point P6, center point P3, and point P5. Point P6 is the location of attachment point P2 when the conveyed paper RHa is on imaginary line KT1. Point P5 is where imaginary line KT2 extending from point P4 is tangent to the circumference of the core Ra. Imaginary line KT2 describes the position of the conveyed paper RHa when attachment point P2 is positioned point P5 or downstream in the direction of rotation KH with respect to point P5 due to rotation of the spindle 12 after the unrolled paper RH has been delivered to the trailing end of the label paper and the conveyed paper RHa reaches imaginary line KT1.

After the spindle 12 starts turning the specific amount of rotation, the controller 30 monitors for the detection value input from the detection switch 15 to change from the first state to the second state, and monitors if the spindle 12 has finished turning the specific amount of rotation.

If before the spindle 12 finishes turning the specific amount of rotation the detection value input from the detection switch 15 changes from the first detection value to the second detection value, the controller 30 determines the unrolled paper RH has not been delivered to the trailing end of the label paper. As described above, when dragging occurs, if the delivery point P1 moves to the front of the imaginary line KT1 after the conveyed paper RHa is positioned on the imaginary line KT1, force working to tear the conveyed paper RHa from the paper roll RB works on the delivery point P1. The farther the delivery point P1 moves forward from the imaginary line KT1, the tension on the conveyed paper RHa increases and this tearing force increases.

Therefore, as the delivery point P1 moves forward from the imaginary line KT1, the possibility of the conveyed paper RHa separating from the paper roll RB increases. The likelihood is therefore high that the detection value input from the detection switch 15 will change from the first state to the second state before the spindle 12 finishes turning the specific amount of rotation. Therefore, if the detection value input from the detection switch 15 changes from the first state to the second state before the spindle 12 finishes turning the specific amount of rotation, the controller 30 determines that dragging has been eliminated, and the unrolled paper RH has not been delivered to the trailing end of the label paper.

However, if the spindle 12 finishes turning the specific amount of rotation without the detection value input from the detection switch 15 changing from the first detection value to the second detection value, the controller 30 determines that the unrolled paper RH was delivered to the trailing end of the label paper. If the unrolled paper RH was delivered to the trailing end of the label paper, rotation of the spindle 12 by the specific amount of rotation positions the conveyed paper RHa on the imaginary line KT2. Furthermore, because the trailing end is firmly attached, the attachment point P2 will not tear off while travelling from point P6 to point P5, and the sensor of the detection switch 15 will remain depressed. As a result, the detection value input from the detection switch 15 remains the first detection value when the spindle 12 has turned the specific amount of rotation, and the controller 30 will determine that the unrolled paper RH has been delivered from the paper roll RB to the trailing end of the label paper.

The controller 30 of the printer 1 therefore causes the spindle 12 to turn a specific angular distance when the detection value input from the detection switch 15 changes from the second state to the first state. If the detection value input from the detection switch 15 changes from the first detection value to the second detection value before the spindle 12 finishes turning the specific amount of rotation, the controller 30 determines unrolled paper RH was not delivered to the trailing end of the label paper. However, if the spindle 12 finishes turning the specific amount of rotation while the detection value input from the detection switch 15 remains in the first state, the controller 30 determines the unrolled paper RH has been delivered to the trailing end of the label paper. Therefore, even if the delivery point P1 is on the front side of the imaginary line KT1 and the sensor of the detection switch 15 is depressed, the controller 30 can correctly determine that the unrolled paper RH was delivered from the paper roll RB to the trailing end of the label paper.

As described above, a printer 1 according to this embodiment has an inkjet head 10 (printhead); a spindle 12 (roll paper support) that supports the roll paper R; a delivery motor 31$a$ (driver) that causes the roll paper R supported by the spindle 12 to turn; a guide member 14 (path member) that guides the unrolled paper RH (paper) delivered from the paper roll RB; and a detection switch 15 (detector) that detects part of the conveyed paper RHa.

The detection switch 15 is disposed to a position where it can detect part of the conveyed paper RHa when the delivery point P1 moves to the area on the circumference of the paper roll RB on the same side of an imaginary line KT1 as the guide member 14. The delivery point P1 is the point on the circumference of the paper roll RB (roll) of roll paper R where the unrolled paper RH separates from the paper roll RE as the roll paper R turns. Imaginary line KT1 (tangent) is a line touching the guide member 14 and passing through the center point of the paper roll RB.

When the unrolled paper RH does not separate from the paper roll RB as usual and is dragged along the circumference of the paper roll RB, and the delivery point P1 moves to the part of the circumference of the paper roll RB on the same side of the imaginary line KT1 as the guide member 14, the conveyed paper RHa is pulled away from the paper roll RB, and the chance of the detection switch 15 detecting part of the conveyed paper RHa drops. When unrolled paper RH has been delivered from the paper roll RB to the trailing end, delivery point P1, which is now the attachment point P2, moves to the part of the circumference of the paper roll RB on the same side of the imaginary line KT1 as the guide member 14, and the detection switch 15 can detect part of the conveyed paper RHa. Therefore, by disposing the detection switch 15 to the position described above, the printer 1 can correctly determine if unrolled paper RH has been delivered from the paper roll RB to the trailing end of the label paper.

The spindle 12 has a flange F1 that contacts the end RT1 of the paper roll RB, and a flange F2 that contacts the other end RT2 of the paper roll RB.

In this configuration, even when dragging results from the flange F1 and flange F2, by disposing the detection switch 15 to the position described above, the chance of detection errors resulting from dragging is reduced, and the printer 1 can correctly determine when the unrolled paper RH has been delivered from the paper roll RB to the trailing end of the label paper.

The unrolled paper RH in this embodiment of the invention is label paper having labels affixed to a liner.

Even when dragging occurs due to adhesive from the label paper, by disposing the detection switch 15 to the position described above, this configuration reduces the chance of detection errors resulting from dragging, and the printer 1 can correctly determine when the unrolled paper RH has been delivered from the paper roll RB to the trailing end of the label paper.

The detection switch 15 has a mechanical sensor.

Because the detection switch 15 in this configuration has a mechanical sensor, the chance of the state of the sensor being changed by chaff or paper dust from the roll paper, for example, is reduced. The chance of the controller 30 erroneously determining, due to foreign matter such as chaff or paper dust from the roll paper R, that the unrolled paper RH has been delivered from the paper roll RB to the trailing end of the label paper even though the unrolled paper RH has not been delivered from the paper roll RB to the trailing end of the label paper can therefore be prevented.

The detection switch 15 is also disposed to the side of the guide member 14 facing the spindle 12.

By disposing the detection switch 15 to this surface 14a, the sensor of the detection switch 15 reliably contacts part of the conveyed paper RHa moving up and rotating around the end 40. As a result, the detection switch 15 reliably detects that the conveyed paper RHa is positioned above the imaginary line KT1. That the position of the conveyed paper RHa is above the imaginary line KT1 indicates that the unrolled paper RH has been delivered to the trailing end of the label paper. Therefore, by disposing the detection switch 15 to surface 14a, the printer 1 can more reliably determine that the unrolled paper RH has been delivered to the trailing end of the label paper.

The invention is described above with reference to a preferred embodiment thereof, but the invention is not limited thereto and can be modified and adapted in many ways without departing from the scope of the accompanying claims.

A detection switch 15 having a mechanical sensor is used as an example of the detector in the embodiment described above, However, the detector may be configured to emit light from a specific position to the unrolled paper RH, detect the light that is reflected, and output a detection value corresponding to the reflected light to the controller 30.

The function blocks described with reference to the accompanying figures are grouped according to the main content of the processes of the functional configurations of the devices to facilitate understanding the invention. The configuration of the devices may be divided into further elements according to the process content. A single functional element may also be configured to execute more processes. The processes of the component elements may also be executed by a single hardware component, or by multiple hardware components. Yet further, the processes of the component elements may be embodied by a single program, or by multiple programs.

An inkjet printer is used as an example of the printer 1 in the foregoing embodiment, but the invention is not so limited to inkjet printers. More specifically, the invention can be broadly applied to many kinds of devices holding a roll of label paper or other media having the trailing end thereof attached to a core Ra.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printer comprising:
a printhead;
a roll paper support that supports roll paper;
a driver configured to rotate the roll paper supported by the roll paper support;
a path member configured to contact paper delivered from the roll paper;
a detector configured to detect the paper when a delivery position on the circumference of the roll of roll paper moves to a specific area on the circumference of the roll, the delivery position being a position where the paper separates from the roll when the roll paper turns, the specific area being the area of the circumference on a same side of a line as the path member, the line being tangent to the path member and passing through the center of the roll, and the detector being configured to output a detection signal having a first detection value when the paper is detected and having a second detection value when the paper is not detected; and
a controller configured to monitor the detection signal while the driver rotates the delivery position of the roll paper by a predetermined amount from the line into the specific area, and to determine that the roll paper has not been delivered to a trailing end of the paper responsive to the detection signal having the second detection value for at least some time while the driver rotates the roll paper by the predetermined amount.

2. The printer described in claim 1, wherein:
the roll paper support has a flange configured to contact an end of the roll of roll paper.

3. The printer described in claim 1, wherein:
the paper is label paper having labels affixed to a liner.

4. The primer described in claim 1, wherein:
the detector has a mechanical sensor.

5. The printer described in claim 1, wherein:
the detector is disposed to the path member on a surface opposite to the roll paper support.

6. The printer described in claim 1, further comprising:
a slack sensor configured to detect slack occurring vertically below the roll paper,
wherein the controller is configured to determine the paper was delivered to the trailing end based on the slack not being detected by the slack sensor and the detector outputting the first detection value.

7. The printer described in claim 1, wherein the controller is further configured to determine that the paper was delivered to the trailing end based on the detection signal not having the second detection value while the driver rotates the roll paper by the predetermined amount.

8. A control method of a printer having a printhead,
a roll paper support that supports roll paper,
a driver configured to rotate the roll paper supported by the roll paper support, and
a path member configured to contact paper delivered from the roll paper,
the control method comprising steps including:
detecting when a delivery position on the circumference of the roll of roll paper moves to a specific area on the circumference of the roll, the delivery position being a position where the paper separates from the roll when the roll paper turns, the specific area being the area of the circumference on a same side of a line as the path member, the line being tangent to the path member and passing through the center of the roll;
monitoring a detection signal while the driver rotates the delivery position of the roll paper by a predetermined amount from the line into the specific area, the detection signal having a first detection value when the paper is detected and having a second detection value when the paper is not detected; and
determining whether the roll paper has been delivered to a trailing end of the paper based on whether the detection signal has the second detection value for at least some time while the driver rotates the roll paper by the predetermined amount.

9. The control method described in claim 8, further comprising:
detecting slack occurring vertically below the roll paper; and
determining the paper was delivered to the trailing end based on the slack not being detected and the point from which the paper separates from the roll being detected to have moved to the specific area.

10. The control method described in claim 8, further comprising determining that the paper was delivered to the trailing end based on the detection signal not having the second detection value while the driver rotates the roll paper by the predetermined amount.

* * * * *